(12) United States Patent
Akarsu et al.

(10) Patent No.: US 8,003,579 B2
(45) Date of Patent: Aug. 23, 2011

(54) OIL-, HOT WATER-AND HEAT-RESISTANT BINDERS, PROCESS FOR PREPARING THEM AND THEIR USE

(75) Inventors: Murat Akarsu, Saarbrücken (DE); Helmut Schmidt, Saarbrücken-Güdingen (DE)

(73) Assignee: EPG (Engineered nanoProducts Germany) AG, Zweibruecken (DE)

( * ) Notice: Subject to any disclaimer, the term of this patent is extended or adjusted under 35 U.S.C. 154(b) by 358 days.

(21) Appl. No.: 12/294,307

(22) PCT Filed: Apr. 23, 2007

(86) PCT No.: PCT/EP2007/003548
§ 371 (c)(1),
(2), (4) Date: Dec. 15, 2008

(87) PCT Pub. No.: WO2007/121972
PCT Pub. Date: Nov. 1, 2007

(65) Prior Publication Data
US 2009/0250218 A1 Oct. 8, 2009

(30) Foreign Application Priority Data
Apr. 24, 2006 (DE) .......................... 10 2006 018 938

(51) Int. Cl.
C09K 8/56 (2006.01)
E21B 33/13 (2006.01)
C08L 83/04 (2006.01)
C08G 77/00 (2006.01)

(52) U.S. Cl. .................... 507/233; 166/292; 166/305.1; 507/127; 524/588; 528/10; 556/9; 556/402

(58) Field of Classification Search ................ 507/233, 507/127; 166/292, 305.1; 524/588; 528/10; 556/9, 402
See application file for complete search history.

(56) References Cited

U.S. PATENT DOCUMENTS

| | | |
|---|---|---|
| 5,415,688 A | 5/1995 | Gasmena et al. |
| 6,287,639 B1 | 9/2001 | Schmidt et al. |
| 6,352,610 B1 | 3/2002 | Schmidt et al. |
| 6,378,599 B1 | 4/2002 | Schmidt et al. |
| 6,513,592 B2 | 2/2003 | Espin et al. |
| 2007/0158070 A1 | 7/2007 | Endres et al. |
| 2008/0103067 A1 | 5/2008 | Scmidt et al. |
| 2010/0316447 A1 * | 12/2010 | Schmidt et al. .......... 405/128.75 |

FOREIGN PATENT DOCUMENTS

| | | |
|---|---|---|
| CA | 1 216 704 | 1/1987 |
| DE | 196 47 368 | 5/1998 |
| DE | 10 2004 004 615 | 8/2005 |
| DE | 10 2005 002 806 | 8/2006 |
| FR | 2 561 553 | 9/1985 |

OTHER PUBLICATIONS

Brinker C. J. et al., Sol Gel Science—The Physics and Chemistry of Sol-Gel-Processing, (Academic Press, Boston San Diego, New York, Sydney 1990); pp. 108-115.

\* cited by examiner

*Primary Examiner* — Timothy J. Kugel
(74) *Attorney, Agent, or Firm* — Greenblum & Bernstein, P.L.C.

(57) ABSTRACT

A process for preparing a binder which comprises a heterocondensate of silicon compounds and metal and/or boron compounds. The process comprises mixing a silicon component which comprises (A), at least one hydrolyzable silicon compound having a non-hydrolyzable polymerizable group, with water to form a hydrolysis product, and 15 s to 15 min after mixing (A) with water, the addition of (B), at least one compound of boron or a metal selected from Al, Ga, In, Tl, Ge, Ga, Sn, Pb, Ti, Zr, Hf, Sc, Y and La.

35 Claims, No Drawings

OIL-, HOT WATER-AND HEAT-RESISTANT BINDERS, PROCESS FOR PREPARING THEM AND THEIR USE

BACKGROUND OF THE INVENTION

1. Field of the Invention

The invention relates to a process for the preparation of a binder, the binder obtainable therefrom, the use thereof and the cured moldings produced therewith.

2. Discussion of Background Information

Sol-gel processes are based as a rule on the hydrolysis and condensation of alkoxides, as a rule in combination with silanes. These processes have long been known. Details of the sol-gel process are described, for example, in C. J. Brinker, G. W. Scherer: "Sol-Gel Science—The Physics and Chemistry of Sol-Gel-Processing", Academic Press, Boston, San Diego, New York, Sydney (1990). A large number of compositions have been investigated. Orthosilicic esters have been used, for example, for more than 50 years as binders for refractory products. As long ago as 1939, Schröder and Geffcken filed patents for the coating of glasses by means of sol-gel processes. In the course of the decades, many industrial applications of sol-gel processes have become known, which as a rule concentrate on applications in the form of thin layers. Substantially based on the pioneering work of Schmidt et al., so-called hybrid materials in which organoalkoxysilanes were condensed together with alkoxides of other elements were developed, which gave so-called inorganic-organic hybrid materials, such as, for example, ormosils, ormocers, ceramers or polycerams.

Typical of these compounds is that they use the above-mentioned organoalkoxysilanes as a linking member to the organic moiety since silicon is virtually the only inorganic element which has a silicon-carbon bond stable under ambient conditions. By functionalizing the bond, any desired organic functions can be linked to the silicon. Owing to the hydrolyzable radicals of the alkoxysilane, inorganic networks can be built up by hydrolysis and condensation. Via the variations of the organic radical, virtually all functions which are known from organic chemistry can be introduced into the condensates.

Countless publications about this type of hybrid materials exist in the literature. Ormocers have also already become industrially important in large amounts for coating materials, for example as hard layers and corrosion protection layers. The silicon-oxygen-silicon bond constitutes an intrinsic disadvantage of these materials. Owing to its nature, it is sensitive to bases. Consequently, virtually no alkali-resistant coatings can be prepared using such systems. As our own investigations have shown, such systems are also sensitive to water at elevated pressure and elevated temperature, very particularly under hydrothermal conditions.

As is sufficiently known from the literature, a second network in the form of a polymeric chain can be incorporated by the use of polymerizable functional groups on the silicon if the polymerizable organic groups are linked to one another. In addition, it is also possible to add thereto organic monomers which then lead to longer organic polymeric chains. Such hybrid materials are designated as so-called IPN polymers (interpenetrating polymeric networks), cf. for example, Römpp Chemie Lexikon, 9th edition, page 2007. The inter-penetrating networks may or may not be covalently linked to one another. In the latter case, a physical mixture is present. Different curing mechanisms may exist in such materials: firstly, the inorganic condensation in which silicon-oxygen-silicon bonds are established and, secondly, the organic linkage in which organic polymer chains form. If polyfunctional monomers are used, it is also possible to build up three-dimensional organic networks.

The organic polymer chains make it possible to change the mechanical properties of the materials. While the pure inorganic bonds lead to brittle materials which require temperatures above the transformation point (in the case of glasses) or above the crystallization temperature (in the case of ceramic materials) for compaction, hybrid materials can as a rule be compacted even at very low temperatures between 60 and 150° C.

While the inorganic materials are very stable to organic solvents or oils, materials which are based on organic polymer chains tend to swell or complete dissolution may occur, particularly at relatively high temperatures. Conversely, there are many organic polymers which are very alkali-stable. This means that an improvement in the alkali stability can be achieved by incorporating such polymers into the silicate networks. However, the fundamental dissolution of the silicate network by alkali attack or hydrothermal attack cannot be avoided. The silicon-oxygen-silicon bond is moreover reversible. While it can be formed by condensation from SiOH groups with elimination of water, it can undergo a reaction relatively rapidly back to SiOH groups with cleavage of the bond, particularly at high water vapour partial pressures and high temperatures.

In the case of the properties described above, such hybrid materials tend to undergo rapid decomposition under the hydrothermal conditions, particularly when organic solvents are also present. Thus, for example, our own investigations in autoclaves under simulated conditions which correspond, for example, to those at a water depth of 1000 m on binders having in principle a similar composition, as were proposed in U.S. Pat. No. 6,513,592 by PDVSA for fixing sand-containing deposits in mineral oil-containing formations, have shown that sand-containing moldings which have been bound with such binders to give compact bodies very rapidly undergo complete dissolution under these conditions in the autoclave. The dissolution process takes place particularly rapidly if a mixture of mineral oil and salt-containing water is used. This can be interpreted to mean that the hot water and the high pressure destroy the silicate bond and the crude mineral oil, which contains very many different compounds, including aggressive ones, attacks or dissolves the organic groups. Such binders are not suitable for the consolidation of loose formations, sands or rocks, as is of the greatest importance in mineral oil production.

The binders mentioned in DE-A-19647368 and DE-A-102004004615 for this application show improved stability but in principle also decompose under autoclave conditions of, for example, 70° C. at 70 bar.

Patent Application DE 102005002806.3 describes a process for the preparation of consolidated proppants in which a hydrolysis product or condensate of an organosilane, a hydrolyzable silane and a metal compound is used as a consolidating agent. These show substantially improved hydrolysis stability and corrosion stability under hydrothermal conditions, but a further improvement in the stability under said hydrothermal conditions is desirable and is a requirement in various cases for an application according to DE 102005002806.3.

It is known in the literature that glasses increase in hydrolysis stability by the incorporation of elements of the third and fourth main groups. Such elements are, for example, aluminum, zirconium or titanium. Boron, too, has such an effect, as do some divalent or trivalent elements, such as, for example, iron, calcium or lead. It is known that titanium has a particularly good effect if titanium is incorporated as a so-called network former in the glass structure.

The attempt to incorporate titanium via customary hydrolysis and condensation homogeneously or in molecular dispersion into hybrid structures cannot however be realized in practice owing to the very different reaction rates of titanium alkoxides and organoalkoxysilanes. On addition of water, nanoparticulate, in some cases already crystalline, particles form, which may be distributed in the matrix (also uniformly) but are not integrated in molecular or oligomeric form into the network. Consequently, the effect of alkali stability is not achieved because the portion of Si—O—Ti groups remains low. Accordingly, such hybrid materials, at least some of which are nanocomposites, were also substantially degraded in the autoclave test and show only little activity for the stable binding of sand-containing formations under such conditions.

The object was to provide binders which are absolutely stable under the above mentioned conditions and exhibit no degradation phenomena.

SUMMARY OF THE INVENTION

The present invention provides a process for preparing a binder which comprises a heterocondensate of silicon compounds and metal and/or boron compounds. The process comprises
  (a) mixing a silicon component which comprises (A), i.e., at least one hydrolyzable silicon compound having a non-hydrolyzable polymerizable group, with water to form a hydrolysis product and
  (b) 15 s to 15 min after mixing (A) with water, adding (B), i.e., at least one compound of boron or a metal selected from Al, Ga, In, Tl, Ge, Ga, Sn, Pb, Ti, Zr, Hf, Sc, Y and La, to the hydrolysis product.

In one aspect of the process, (b) may be carried out close to a transition point at which the aqueous phase and the organic phase which are formed upon mixing (A) with water become a single phase.

In another aspect, (A) and (B) may be employed in a solvent-free state and/or (B) may be added in one shot.

In another aspect of the process of the present invention, the water used in (a) may comprise a catalyst, for example, an acid.

In yet another aspect, the binder may be allowed to ripen for at least 1 h after step (b) has been conducted.

In a still further aspect, additional water may be added after (b) has been conducted.

In another aspect of the process of the present invention, the Si component may further comprise at least one hydrolyzable silicon compound selected from hydrolyzable silanes having at least one non-hydrolyzable organic group and hydrolyzable silanes without non-hydrolyzable groups.

In another aspect, at least one polysiloxane having at least one reactive group may be added. For example, the at least one polysiloxane may comprise at least one silanol or alkoxy group as a reactive group.

In yet another aspect, the process of the present invention may further comprise the addition to the binder of a polymerization catalyst and/or of at least one organic monomer, oligomer or polymer which comprises at least one functional group that is reactive with the polymerizable group of (A).

In another aspect of the present process, (B) may comprise at least one compound which selected from compounds of B, Al, Sn, Ti and Zr, for example, at least one alkoxide of titanium, zirconium or aluminum, and in particular, a Ti compound.

In a still further aspect of the process, the molar ratio of Si atoms to metal and/or boron atoms in the binder may be from 10:1 to 1:3.

In another aspect, the process may further comprise the addition of a solvent and/or a further additive.

The present invention also provides a binder which comprises a heterocondensate which is a metallosiloxane and/or a borosiloxane and comprises (i) units of heteroatoms selected from B, Al, Ga, In, Tl, Ge, Ga, Sn, Pb, Ti, Zr, Hf, Sc, Y and La, incorporated into a siloxane sceleton via oxygen bridges, and (ii) siloxane units in which a silicon atom carries a non-hydrolyzable organic polymerizable group.

In one aspect, the binder may be obtainable by the process of the present invention (including the various aspects thereof) as set forth above.

In another aspect, the binder may comprise a binder sol and/or may be particle-free.

In yet another aspect, the binder may comprise the heterocondensate as an inorganic component and one or more substances selected from organic monomers, oligomers or polymers as an organic component, which inorganic and organic components are capable of forming, upon curing, an inorganic-organic composite as an interpenetrating polymeric network. For example, the weight ratio of heterocondensate and organic component, based on a cured binder, may be from 95:5 to 5:95.

In a still further aspect, the binder of the present invention may further comprise a polymerization catalyst which can initiate an organic polymerization and in particular, a thermal initiator.

In another aspect of the binder of the present invention, the units of heteroatoms may comprise at least one of B, Al, Sn, Ti and Zr. For example, the heterocondensate may comprise a titanosiloxane.

The present invention also provides a method of consolidating (i) geological formations, (ii) inorganic granules and/or (iii) beds of granules used in oil and gas production for keeping the wells clear. The method comprises using the binder of the present invention (including the various aspects thereof) as set forth above.

In one aspect of the method, the binder may be mixed with a bed of inorganic granules or the geological formation and may be thermally cured. For example, the binder may be infiltrated into the bed or formation.

The present invention also provides a method of treating contaminated sand. The method comprises using the binder of the present invention (including the various aspects thereof) as set forth above.

The present invention also provides a molding which comprises the binder of the present invention (including the various aspects thereof) as set forth above and a particulate or fibrous material, for example inorganic granules.

In one aspect, the molding may comprise a porous molding.

In another aspect of the molding, the cured binder may be an IPN polymer.

The object according to the invention could surprisingly be achieved if the metal- or boron-containing component is added to the corresponding sol or corresponding solution immediately after the hydrolysis of the silicon compounds and the associated consumption of the molecular water, before the hydrolyzed silicon compounds begin to condense with themselves and have therefore again produced molecular water in an amount sufficient to precipitate $TiO_2$ or a corresponding other metal oxide. The reactive groups of the metal- or boron-containing component will react with resulting hydroxyl groups of the silicon compounds without hydrolysis of the metal- or boron-containing component. Consequently, the homogeneous, i.e. low molecular weight or molecular disperse, distribution of the metal- or boron-containing components in the sol or in the solution is permitted and formation of the nanoparticulate metal oxides or boron oxides, such as $TiO_2$ after the addition of water is prevented or kept at a very low level. The evidence for the effectiveness of the process according to the invention arises from the circumstance that, after this step, even the addition of a large excess of water, for example 3 to 4 times the stoichiometric amount, leads to no precipitation or formation of crystalline products or particles at all. This could be demonstrated in the below-mentioned examples according to the invention for example by PCS.

Accordingly, the invention relates to a process for the preparation of a binder comprising a heterocondensate of silicon compounds and metal or boron compounds, in which A) at least one hydrolyzable silicon compound having a non-hydrolyzable polymerizable group as an Si component is mixed with water to form a hydrolysis product and then B) at least one metal or boron compound, the metal being selected from Al, Ga, In, Tl, Ge, Ga, Sn, Pb, Ti, Zr, Hf, Sc, Y and La, is added to the hydrolysis product at a time which is within 15 s to 15 min after the mixing of the hydrolyzable silicon compounds with the water.

For the preparation of the metal- or boron-containing binder, at least one silicon compound and at least one metal- or boron-containing, preferably one titanium-containing, component are used. In a preferred embodiment, an organic matrix which can be linked via polymerization reactions to the inorganic matrix comprising silicon compound and metal- or boron-containing component can also be added to the binder. The process according to the invention surprisingly gives homogeneous metal- or boron-containing binders which, when used for the production of a molding, substantially improve the corrosion resistance of the molding obtained. In addition, the compressive strength of the moldings formed with the binder can be improved in a further preferred embodiment by using long-chain silicon compounds, such as, for example, poly(alkoxysilanes) or polyalkylsiloxanes having reactive terminal groups, the resilience of the molding arising from the formation of a long-chain inorganic network.

In the process according to the invention, a heterocondensate of silicon compounds and metal or boron compounds is formed. At least one hydrolyzable silicon compound having a non-hydrolyzable organic polymerizable group is used as the Si component. It is also possible to use two or more of these compounds together. The polymerizable organic group may be any customary group which is known to the person skilled in the art and can undergo polymerization with itself or with one or more other corresponding polymerizable groups. Here, polymerization embraces in the description very generally polycondensation and polyaddition.

The at least one hydrolyzable silicon compound having a non-hydrolyzable organic polymerizable group is, for example, a compound of the general formula (I)

$$(Rx)_b R_c SiX_{4-b-c} \qquad (I)$$

in which the radicals Rx are identical or different and represent groups which cannot be eliminated hydrolytically and comprise at least one polymerizable group, the radicals R are identical or different and represent groups which cannot be eliminated hydrolytically, the radicals X are identical or different and represent groups which can be eliminated hydrolytically or hydroxyl groups, b has the value 1, 2 or 3 and c has the value 0, 1 or 2, the sum (b+c) being 1, 2 or 3. In the formula (I), b is preferably 1 and c is preferably 0, so that the polymerizable organosilane of the formula (I) is preferably $(Rx)SiX_3$ or $(Rx)R_cSiX_{3-c}$.

Suitable examples of hydrolytically cleavable or hydrolyzable groups X are hydrogen, halogen (F, Cl, Br or I, in particular Cl or Br), alkoxy (e.g. $C_{1-6}$-alkoxy, such as, for example, methoxy, ethoxy, n-propoxy, isopropoxy and n-butoxy, isobutoxy, sec-butoxy or tert-butoxy), aryloxy (preferably $C_{6-10}$-aryloxy, such as, for example, phenoxy), alkaryloxy, e.g. benzoyloxy, acyloxy (e.g. $C_{1-6}$-acyloxy, preferably $C_{1-4}$-acyloxy, such as, for example, acetoxy or propionyloxy) and alkylcarbonyl (e.g. $C_{2-7}$-alkylcarbonyl, such as acetyl). Also suitable are $NH_2$, amino mono- or disubstituted by alkyl, aryl and/or aralkyl, examples of the alkyl, aryl and/or aralkyl radicals being those stated below for R, amido, such as benzamido, or aldoxime or ketoxime groups. Two or three groups X may also be linked to one another, e.g. in the case of Si-polyol complexes with glycol, glycerol or pyrocatechol. Said groups may optionally contain substituents, such as halogen, hydroxyl or alkoxy.

Preferred hydrolyzable radicals X are halogen, alkoxy groups and acyloxy groups. Particularly preferred hydrolyzable radicals are alkoxy groups, more preferably $C_{1-4}$-alkoxy groups, in particular methoxy and ethoxy.

The radicals R which cannot be eliminated hydrolytically are, for example, alkyl, e.g. $C_{1-20}$-alkyl, in particular $C_{1-4}$-alkyl, such as methyl, ethyl, n-propyl, isopropyl, n-butyl, isobutyl, sec-butyl and tert-butyl, aryl, in particular $C_{6-10}$-aryl, such as phenyl and naphthyl, and corresponding aralkyl and alkaryl groups, such as tolyl and benzyl, and cyclic $C_3$-$C_{12}$-alkyl and $C_3$-$C_{12}$-alkenyl groups, such as cyclopropyl, cyclopentyl and cyclohexyl. The radicals R may have customary substituents, e.g. halogen, such as chlorine or fluorine and alkoxy. The radical R has no polymerizable group. Preferred radicals R are alkyl groups having preferably 1 to 4 carbon atoms, in particular methyl and ethyl, and aryl radicals, such as phenyl.

The radicals Rx comprise at least one polymerizable group via which crosslinking of the condensate forming with one another or with the optionally added organic monomers or oligomers is possible. Examples of the polymerizable group are epoxide, such as, for example, glycidyl or glycidyloxy, hydroxyl, amino, monoalkylamino, dialkylamino, optionally substituted anilino, amido, carboxyl, alkenyl, alkynyl, acryloyl, acryloyloxy, methacryloyl, methacryloyloxy, mercapto, cyano, isocyanato, aldehyde, keto, alkylcarbonyl, acid anhydride and phosphoric acid. These substituents are bonded to the silicon atom via divalent bridge groups, in particular alkylene or arylene bridge groups, which may be interrupted by oxygen or —NH-groups. The bridge groups contain, for example, 1 to 18, preferably 1 to 8 and in particular 1 to 6 carbon atoms. Said divalent bridge groups are derived, for example, from the abovementioned monovalent alkyl or aryl radicals, it also optionally being possible for a double bond to occur in the chain. The bridge group is preferably an alkylene group, in particular a propylene group. The radical Rx preferably has a polymerizable group but may also have more than one functional group. Preferred polymerizable groups by which crosslinking is possible are vinyl, acryloyl, acryloyloxy, methacryloyl or methacryloyloxy.

Preferred examples of radicals Rx which cannot be eliminated hydrolytically and have polymerizable groups are alkenyl, e.g. $C_{2-20}$-alkenyl, in particular $C_{2-4}$-alkenyl, such as vinyl, 1-propenyl (allyl), 2-propenyl and butenyl, alkynyl, a glycidyl or a glycidyloxy-$(C_{1-20})$-alkylene radical, such as β-glycidyloxyethyl, γ-glycidyloxypropyl, δ-glycidyloxybutyl, ε-glycidyloxypentyl, ω-glycidyloxyhexyl, and 2-(3,4-epoxy-cyclohexyl)ethyl, a (meth)acryloyloxy-($C_{1-6}$)-alkylene radical, e.g. (meth)acryloyloxy-methyl, (meth)acryloyloxy-ethyl, (meth)acryloyloxypropyl or (meth)acryloyloxybutyl, and a 3-isocyanatopropyl radical. Particularly preferred radicals are γ-glycidyloxypropyl, vinyl and (meth)acryloyloxypropyl. Here, (meth)acryloyl represents acryloyl and methacryloyl. These functionalized organosilanes are also designated, for example, as (meth)acryloylsilanes, vinylsilanes, epoxysilanes, etc., according to their functionalized groups.

Specific examples are glycidyloxypropyltrimethoxysilane (GPTS), γ-glycidyloxypropyltriethoxysilane (GPTES), 3-isocyanatopropyltriethoxysilane, 3-isocyanatopropyldimethylchlorosilane, 3-aminopropyltrimethoxysilane (APTS). Preferred examples are vinylsilanes, acryloylsilanes and methacryloylsilanes, such as vinyltriethoxysilane, (meth)acryloyloxyalkyltrimethoxysilane and (meth)acryloyloxyalkyl-triethoxysilane, in particular (meth)acryloyloxypropyltrimethoxysilane and (meth)acryloyloxypropyltriethoxysilane, (meth)acryloyloxypropylmethyldimethoxysilane, (meth)acryloyloxyethyltrimethoxysilane and (meth)acryloyloxyethylmethyldimethoxysilane, methacryloyloxypropyltrimethoxysilane being particularly preferred.

Further examples are:
$CH_2$=CH—Si(OOCCH$_3$)$_3$, $CH_2$=CH—SiCl$_3$, $CH_2$=CH—Si(OC$_2$H$_5$)$_3$, $CH_2$=CHSi(OC$_2$H$_5$)$_3$, $CH_2$=CH—Si(OC$_2$H$_4$OCH$_3$)$_3$, $CH_2$=CH—CH$_2$—Si(OC$_2$H$_5$)$_3$, $CH_2$=CH—CH$_2$—Si(OCH$_3$)$_3$, $CH_2$=CH—CH$_2$—Si(OOCCH$_3$)$_3$, $CH_2$=C(CH$_3$)COO—C$_3$H$_7$—Si(OC$_2$H$_5$)$_3$,

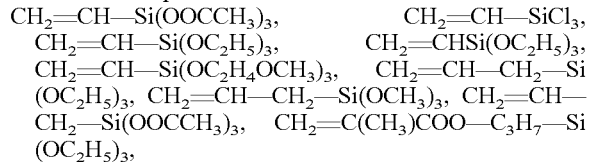

In preferred embodiments, one or more further silicon compounds are used as the Si component in addition to the (a) at least one silicon compound having a polymerizable group. Preferred further Si components are (b) hydrolyzable silanes having at least one non-hydrolyzable organic group and/or (c) hydrolyzable silanes without non-hydrolyzable organic groups.

The optional Si component (b) is an organosilane without a polymerizable group. Examples are organosilanes of the general formula (II)

$$R_nSiX_{4-n} \quad (II)$$

in which the radicals R are identical or different and represent groups which cannot be eliminated hydrolytically, the radicals X are identical or different and represent groups which can be eliminated hydrolytically or hydroxyl groups and n has the value 1, 2 or 3, preferably 1 or 2.

Examples of R and X, including preferred examples, correspond to the abovementioned examples for R and X in the formula (I). Preferred radicals R are alkyl groups having preferably 1 to 4 carbon atoms, in particular methyl and ethyl, and aryl groups, such as phenyl. X is preferably alkoxy.

Examples of organosilanes of the general formula (II) are compounds of the following formulae, the alkylsilanes and in particular methyltriethoxysilane being particularly preferred:
CH$_3$SiCl$_3$, CH$_3$Si(OC$_2$H$_5$)$_3$, C$_2$H$_5$SiCl$_3$, C$_2$H$_5$Si(OC$_2$H$_5$)$_3$, C$_3$H$_7$Si(OC$_2$H$_5$)$_3$, C$_6$H$_5$Si(OC$_2$H$_5$)$_3$, (C$_2$H$_5$O)$_3$Si—C$_3$H$_6$—Cl, (CH$_3$)$_2$SiCl$_2$, (CH$_3$)$_2$Si(OC$_2$H$_5$)$_2$, (CH$_3$)$_2$Si(OCH$_3$)$_2$, (CH$_3$)$_2$Si(OH)$_2$, (C$_6$H$_5$)$_2$SiCl$_2$, (C$_6$H$_5$)$_2$Si(OC$_2$H$_5$)$_2$, (i-C$_3$H$_7$)$_3$SiOH, n-C$_6$H$_{13}$CH$_2$CH$_2$Si(OC$_2$H$_5$)$_3$, n-C$_8$H$_{17}$CH$_2$CH$_2$Si(OC$_2$H$_5$)$_3$, CH$_2$OCH$_2$CH$_2$—O—(CH$_2$)$_3$—Si(OC$_2$H$_5$)$_3$, Examples of the Si component (c) are hydrolyzable silanes without non-hydrolyzable groups of the general formula (III)

$$SiX_4 \quad (III)$$

in which the radicals X have the above meaning, including the preferred meaning, for X in formula (I).

Examples of the hydrolyzable silanes of the general formula (III) are Si(OCH$_3$)$_4$, Si(OC$_2$H$_5$)$_4$, Si(OC$_3$H$_7$)$_4$, SiCl$_4$, HSiCl$_3$, Si(OOCCH$_3$)$_4$. Of these hydrolyzable silanes, tetraethoxysilane is particularly preferred.

In a particularly preferred embodiment, both at least one Si component (b) and an Si component (c) are added in addition to the Si component (a). As an Si component, the Si component (a) alone or optionally as a mixture with the Si component (b) and/or the Si component (c) is subjected to hydrolysis by the addition of water.

Particularly preferably used silicon compounds are methacryloyloxy-propyltrimethoxysilane (MPTS), tetraethoxysilane (TEOS), methyltriethoxysilane (MTEOS) and vinyltriethoxysilane (VTES), a combination of these compounds being used as the Si component in a particularly preferred embodiment.

It was surprisingly found that a further improvement can be achieved if polysiloxanes, such as, for example, poly(alkoxysilanes) or polyalkylsiloxanes or corresponding polyarylsiloxanes and copolymers thereof, are used as an additional component. It is possible to use polysiloxanes which carry no reactive groups. However, polysiloxanes which have at least one reactive group, in particular one reactive terminal group, are preferably used. IPN polymers having covalent bonds between the interpenetrating polymers can be obtained thereby. However, IPN polymers which are purely physically mixed may also be formed.

There is a large variety of poly(alkoxysilanes), polyalkylsiloxanes and polyarylsilanes and copolymers thereof having reactive terminal groups. In particular, such polysiloxanes, especially polyalkylsiloxanes, having reactive groups or terminal groups are commercially available, for example from Gelest, Inc., Philadelphia. Examples of the reactive group or terminal group are vinyl, hydride, silanol, alkoxy, amino, epoxy, carbinol, methacrylate/acrylate, mercapto, acetoxy, chloride and dimethylamino. Via the reactive groups or terminal groups, the polysiloxanes can be incorporated into the inorganic network and optionally into the organic matrix or crosslinked. If, for example, polysiloxanes having silanol terminal groups are used, the silanol group will react with hydroxyl groups of the hydrolysed silanes or of the metal or boron compounds. This surprisingly increases the resilience or compressive strength of the molding even further.

The polysiloxanes may be cyclic, branched or preferably linear. The reactive group may be present on the main chain or a side chain but is preferably a terminal group. It is of course possible for more than one reactive group to be present, e.g. 2 or more reactive groups. A linear polysiloxane contains, for example, preferably 2 reactive terminal groups. Preferably, polysiloxanes having silanol and alkoxy groups, in particular polysiloxanes having silanol terminal groups, are used as polysiloxanes having reactive groups or terminal groups.

Examples of poly(alkoxysilanes), polyalkylsiloxanes or polyarylsiloxanes and copolymers thereof are polydimethylsiloxanes, polydiethylsiloxanes, polymethylethylsiloxanes, polydiphenylsiloxanes and corresponding copolymers which in each case contain at least one reactive group. Specific examples are polydimethylsiloxanes having silanol terminal groups or having alkoxy terminal groups, poly(diethoxysiloxanes) and polydimethoxysiloxanes.

The molecular weight of the polysiloxanes used may be selected from a large range depending on the field of use, for example in the range from 100 to 10 000 g/mol. Polysiloxanes having a molecular weight of 100 to 3500 g/mol are preferred, more preferably 300 to 3000 g/mol, e.g. 400 to 2000 g/mol. It is also possible to use higher molecular weight polysiloxanes, for example having a molecular weight up to 50 000 g/mol or more. Here, the molecular weight is understood as meaning the number average molecular weight.

The reaction between polysiloxanes and silicon compounds or metal or boron compounds can take place in the presence of a catalyst, e.g. hexachloroplatinic acid, dibutyltin diacetate or tin-2-ethylhexanoate, or at elevated temperature, e.g. 80° C., without having to hydrolyse the silicon compounds and/or metal or boron compounds beforehand.

The silanes and polysiloxanes can be prepared by known methods; cf. W. Noll, "Chemie und Technologie der Silicone" [Chemistry and Technology of the Silicones], Verlag Chemie GmbH, Weinheim/Bergstraße (1968).

An additional compound, in particular a hydrolyzable compound, of an element selected from main group III, main group IV, subgroup III and subgroup IV is used as a further component for the heterocondensate. B and a metal from these groups, in particular Al, Ga, In, Tl, Ge, Ga, Sn, Pb, Ti, Zr, Hf, Sc, Y and La, are employed thereby. By means of this component, the corrosion resistance of the moldings producible using the binder is increased. Hydrolyzable compounds of titanium, aluminium, zirconium, tin and boron are particularly preferred, titanium compounds being most preferred. The compounds can be used individually or as a mixture of two or more of these elements.

The metal or boron compound may be a compound of the formula (IV)

$$MX_a \quad (IV)$$

in which M is B, Al, Ga, In, Tl, Ge, Ga, Sn, Pb, Ti, Zr, Hf, Sc, Y and La, X is as defined in formula (I), including the preferred examples, it being possible to replace two groups X by an oxo group, and a corresponds to the valency of the element, it also being possible for a to be greater than the valency of M when complex ligands are used or to be smaller than the valency of M when polydentate ligands are used. The valency of M is as a rule 2, 3 or 4. Optionally, the compound of the formula (IV) also comprises a counterion. In addition to the substituents stated in formula (I), X may also be sulphate, nitrate, a complexing agent, such as, for example, a β-diketone, a saturated or unsaturated carboxylic acid or the salt thereof, an inorganic acid or salt thereof and an amino alcohol. The metal or boron compound is preferably a hydrolyzable compound. Metal or boron alkoxides are preferably used.

Preferred metal compounds are the alkoxides of Ti, Zr and Al, in particular of Ti. Suitable metal compounds are, for example, $Ti(OC_2H_5)_4$, $Ti(O-n-$ or $i-C_3H_7)_4$, $Ti(OC_4H_9)_4$, $TiCl_4$, $Ti(O-iC_3H_7)_2Cl_2$, hexafluorotitanic acid, $TiOSO_4$, diisopropoxy-bis(ethylacetoacetato)titanate, poly(dibutyl titanate), tetrakis(diethylamino)titanium, titanium 2-ethylhexoxide, titanium bis(triethanolamine)diisopropoxide, triisopropoxytitanium chloride, $Al(OC_2H_5)_3$, $Al(O-sec-C_4H_9)_3$, $AlCl(OH)_2$, $Al(NO_3)_3$, $Zr(OC_3H_7)_4$, zirconium 2-ethylhexoxide, $BCl_3$, $B(OCH_3)_3$ and $SnCl_4$. It is therefore possible to use compounds which comprise complex ligands, such as, for example, acetylacetone, ethyl acetoacetate, vinyl acetoacetate, methacrylic acid, dialkyl dithiophosphate, dodecylbenzenesulfonic acid, oleic acid and palmitic acid.

Examples are $Zr(OC_3H_7)_2(OOC(CH_3)=CH_2)_2$, titanium acetylacetonate, titanium oxide bis(pentanedionate), $Ti(OC_3H_7)_3(OOC(CH_3)=CH_2)$ and $Ti(OC_2H_4)_3$(allylacetoacetate). Among the metal compounds, $Ti(O-iC_3H_7)_4$, $Ti(OC_4H_9)_4$, titanium bis(triethanolamine)diisopropoxide and $Ti(OC_3H_7)_3(OOC(CH_3)=CH_2)$ are particularly preferred.

The molar ratio of Si atoms of all Si compounds used to the metal atoms and boron atoms of all above-mentioned metal and boron compounds used can be chosen within wide ranges but is preferably 10:1 to 1:3 and more preferably 5:1 to 1:1.

In addition to said metal or boron compounds, additional metal compounds may be used. Examples of such metal compounds are compounds of glass- or ceramic-forming metals, in particular compounds of at least one metal from main group V and/or subgroups II and V to VIII of the Periodic Table of the Elements. These are preferably hydrolyzable compounds of Mn, Cr, Fe, Ni and in particular V or Zn. For example, hydrolyzable compounds of elements of main groups I and II of the Periodic Table of the Elements, e.g. Na, K, Ca and Mg, can also be used. Hydrolysable compounds of the lanthanoids, such as Ce, can also be used. These are, for example, metal compounds of the general formula M'Xa, in which M' is a metal of main groups I, II or V or of subgroups II and V to VIII of the Periodic Table of the Elements or a lanthanoid, and X and a are as defined in formula (IV).

In a further particularly preferred embodiment, a purely organic component is also added so that an additional organic matrix can be built up. Surprisingly, even further improved mechanical strength could be achieved by additional use of such an organic component. In this way, two interpenetrating polymers, namely the heterocondensate and a purely organic polymer result after the curing so that IPN polymers are formed, which were described in general above. The interpenetrating polymers may be purely physically mixed but are preferably covalently linked to one another.

One or more organic monomers, oligomers or polymers which in each case have one or more functional groups are used for the organic component. It is also possible to use a mixture of two or more such monomers, oligomers or polymers. The organic component preferably comprises at least two functional groups. The functional groups serve for the polymerization or linkage of the organic components, it being possible for the said functional groups to be a functional group or corresponding functional groups. It is preferably chosen so that it is reactive with the polymerizable group of the functionalized organosilane. During the curing, the functional groups of the organic component also react with the polymerizable groups of the functionalized organosilane with formation of covalent bonds.

The organic monomers, oligomers or polymers having at least one functional group are very familiar to the person skilled in the art as precursors for the preparation of organic polymers and the person skilled in the art can readily choose them in a suitable manner depending on needs. Examples of expedient functional groups are C=C double bonds, hydroxyl, amino, carboxyl, acid anhydride, epoxide and/or isocyanate groups. Further examples are acid chloride groups, nitrile, isonitrile and SH groups. Preferred functional groups are C=C double bonds, such as vinyl, acryloyl and methacryloyl groups. Suitable polymers having free functional groups are, for example, polyisocyanates, melamine resins, polyesters and epoxy resins.

Examples are mono-, bi- or polyfunctional acrylates and methacrylates. The organic component used may be defined individual compounds or mixtures of compounds having different degrees of polymerization. Examples are diethylene glycol dimethacrylate (DEGMA), triethylene glycol dimethacrylate (TEGDMA), bisphenol A glycidyl methacrylate (BisGMA), bisphenol A diacrylate, diurethane dimethacrylate, urethane dimethacrylate (UDMA), Laromer® acrylates from BASF, Ebecryl®, pentaerythrityl triacrylate (PETIA), hexanediol diacrylate, trimethylolpropane triacrylate, trimethylolpropane trimethacrylate, neopentylglycol dimethacrylate, neopentylglycol diacrylate, epoxyacrylate resins, oligomeric methacrylates, such as LR 8862, LR 8907 from BASF, or oligomeric urethane acrylates, such as UA 19T from BASF.

The organic component is preferably added after the addition of the metal compound or boron compound, more preferably after the ripening. The above-mentioned monomers, oligomers or polymers having acryloyl or methacryloyl groups are preferably used if functionalized organosilanes having (meth)acryloyl, (meth)acryloyloxy or vinyl groups are present in the hydrolysis product or condensate.

The weight ratio of all inorganic components used, including the organic groups present therein, to the purely organic components employed, if they are used, can be chosen within wide ranges and is, for example, 95:5 to 5:95 and preferably 80:20 to 20:80, based on the cured binder.

By adding the organic component, it is possible to synthesize IPN polymers comprising interpenetrating polymers, namely the heterocondensate and the purely organic polymer. In the IPN polymer, the two polymers can be physically mixed or can be linked to one another via covalent bonds.

In the process according to the invention, the hydrolyzable silicon compound is subjected to a hydrolysis in the first stage by mixing with water. This is effected in particular by the sol-gel process. In the sol-gel process, in general the hydrolyzable compounds are hydrolyzed with water, optionally in the presence of acidic or basic catalysts. The hydrolysis is preferably effected in the presence of acidic catalysts, e.g. hydrochloric acid, phosphoric acid or formic acid, at a pH of, preferably, 1 to 3. The sol forming can be adjusted to the viscosity desired for the consolidating agent by suitable parameters, e.g. degree of condensation, solvent or pH. Further details of the sol-gel process are to be found in the abovementioned book by Brinker and Scherer.

In the present process, a catalyst is preferably used for the hydrolysis, preferably an acid, such as hydrochloric acid, phosphoric acid or formic acid. This catalyst is preferably present or dissolved directly in the water to be used.

For the hydrolysis and subsequent condensation, it is possible to use stoichiometric amounts of water, but also smaller or larger amounts, for example up to 1.2 mol of water per mole of the hydrolyzable groups present. A substoichiometric amount of water, based on the hydrolyzable groups present, is preferably used. The amount of water used for the hydrolysis and condensation of the hydrolyzable compounds is preferably 0.1 to 0.9 mol and particularly preferably 0.25 to 0.75 mol of water per mole of the hydrolyzable groups present. Particularly good results are often obtained with less than 0.7 mol of water, in particular 0.45 to 0.65 mol of water, per mole of the hydrolyzable groups present.

Here, hydrolyzable groups present are understood as meaning all hydrolyzable groups of the starting compounds added altogether, i.e. including those metal or boron compounds which are added only later on. As explained below, a part of the intended water can optionally be added at a later time.

The process according to the invention is a two-stage process and is based in particular on the time-controlled addition of the metal or boron compound. As explained above, the hydrolyzable silanes and the metal or boron compounds have different reactivities with respect to hydrolysis and condensation and moreover the hydrolysis products are more or less unstable so that hydrolysis is followed by condensation reactions. If, for example, hydrolyzable silanes and titanium compounds are hydrolyzed simultaneously, separate $TiO_2$ particles are virtually unavoidably formed so that a major part of the Ti is not incorporated into the condensate forming. The result of this is that homogeneous cocondensate cannot form.

According to the invention, it was surprisingly possible to obtain a homogeneous heterocondensate having substantially improved properties if the at least one hydrolyzable metal or boron compound is added at a time which is within 15 s to 15 min after mixing of the hydrolyzable silicon compound with the water. Preferably, the time is 20 s to 10 min, preferably 30 s to 5 min and particularly preferably 45 s to 3 min after the mixing.

The mixing of the hydrolyzable silicon compound with the water, which optionally contains a catalyst, is effected when the total intended amount of water has been added to the hydrolyzable silicon compound, or vice versa. The addition is effected as a rule in one portion and as rapidly as possible (e.g. less than 20 s), preferably in one shot, so that the addition is virtually instantaneous (e.g. less than 5 s). In an expedient procedure, the hydrolyzable silicon compound and optionally the further Si components are initially introduced and then the intended amount of water is added as rapidly as possible. Preferably, stirring is effected during the mixing.

At said time, the addition of the preferably hydrolyzable metal and boron compound is started, likewise preferably with stirring. The addition is preferably effected in one portion and likewise as rapidly as possible (e.g. less than 1 min or 30 s), preferably in one shot (less than 20 s, e.g. about 10 s). Without wishing to be tied to a theory, it is assumed that this time control of the addition ensures that the addition of the metal or boron compound occurs when the hydrolysis of the Si component has substantially taken place, while condensation reactions substantially have not yet taken place.

On addition of water to the hydrolyzable silicon compound or compounds, an aqueous and an organic phase result. This is indicated by turbidity of the stirred reaction mixture. At the transition point, these two phases pass over into one another. This is frequently indicated by virtue of the fact that the reaction mixture becomes clear. Even if the reaction mixture remains turbid, for example owing to polysiloxanes present, this transition point is detectable.

The addition of the metal or boron compound can be controlled even more accurately if the addition is effected as close as possible to the transition point of the reaction mixture. The time when the hydrolyzable metal or boron compound is added is therefore preferably shortly before or after the transition point, which of course includes the transition point itself. Shortly means, for example, less than 3 min, preferably less than 1 min. Although the transition point can be predetermined approximately from preliminary experiments, for reasons of expediency, however, an addition after the transition point is as a rule more reasonable. In a particularly preferred embodiment, the metal or boron compound is added at the time when the transition point has been reached.

The transition point may be reached more quickly or more slowly depending on conditions, such as, for example type and reactivity of the Si components used, or of the optionally used catalyst or the amount of water used. In the preferred embodiments, the transition point is detectable about 1 to 2 min after addition of the water.

The binder obtained can be used as it is. In a preferred embodiment, the binder is allowed to ripen or age by simply allowing it to stand, e.g. for at least 1 h and preferably at least 5 h. Thereafter, it can be used for the intended application.

It was also surprisingly found that an even more homogeneous heterocondensate can be obtained if the starting materials are used undiluted, i.e. without solvents. The hydrolysis and condensation which take place after addition of water and the subsequent addition of the boron or metal compound are therefore preferably carried out without addition of solvent. It should be taken into account that solvents may form in situ during the hydrolysis reactions of the starting materials, such as the alcoholates. The reaction mixture is as a rule therefore not solvent-free as the hydrolysis progresses but is substantially less dilute than is otherwise customary according to the prior art. After completion of the reaction, for example after the above ripening, solvent can be added, for example for adjusting the viscosity.

The intended amount of water can be added completely in step a). In an embodiment, a part of the intended amount can be added only after the addition of the metal or boron compound. In this case, instead of using 100% of the intended amount of water as described above in step a) for the hydrolysis, for example 90 to 20% and preferably 70 to 30% of the intended amount of water are used as described above. The remainder of the intended amount is then added, for example, directly after the addition of the hydrolyzable metal or boron compound or preferably after a ripening. In another embodiment, 100% of the intended amount of water as described above can be used in step a) for the hydrolysis and an additional amount of water can be added after the addition of the metal or boron compound. Expedient amounts for the additional water then correspond to the abovementioned amounts for step a). It is also possible to add more water, especially after ripening is complete.

The polysiloxane component is preferably initially introduced together with the other Si components before the water is added. It can optionally also be added at a later time. The additional metal compounds described above are preferably added together with the metal or boron compound of the formula (IV).

The components described are, as explained above, preferably used as such but can optionally also be diluted in each case with a solvent. Solvents can also be added after the preparation of the binder, for example for adjusting the viscosity. Optionally, it is also possible to use additional solvent for this purpose, but preferably only after a ripening. With the use of alkoxides as starting compounds, the corresponding alcohols form as by-product. Customary additives may also be added as required to the binder prepared. The hydrolysis/condensation reaction usually takes place at about room temperature but may also be carried out at lower or higher temperatures. Usually, the reaction is exothermic so that heating takes place. Cooling can optionally be effected.

Thermal or photolytic catalysts for the polymerization are preferably also added to the binder, preferably thermal initiators. These may be ionic initiators or free radical initiators. The catalyst initiates the polymerization, with the result that the binder is cured or crosslinked. These catalysts are known to the person skilled in the art and he can readily choose the suitable ones taking into account the components used. Examples of free radical thermal initiators are organic peroxides, e.g. diacyl peroxides, peroxydicarbonates, alkyl peresters, alkyl peroxides, perketals, ketone peroxides and alkyl hydroperoxides, and azo compounds. Specific examples are dibenzoyl peroxide, Trigonox® 121, tert-butyl perbenzoate, amyl peroxy-2-ethylhexanoate and azobisisobutyronitrile. An example of an ionic initiator which is suitable for the thermal initiation is 1-methylimidazole. These initiators are used in the customary amounts known to the person skilled in the art, e.g. 0.01 to 5% by weight, based on the total solids content of the binder.

Examples of further solvents which can be used are alcohols, preferably lower aliphatic alcohols ($C_1$-$C_8$-alcohols), such as methanol, ethanol, 1-propanol, isopropanol and 1-butanol, ketones, preferably lower dialkyl ketones, such as acetone and methyl isobutyl ketone, ethers, preferably lower dialkyl ethers, such as diethyl ether, or monoethers of diols, such as ethylene glycol or propylene glycol, with $C_1$-$C_4$-alcohols, amides, such as dimethylformamide, tetrahydrofuran, dioxane, sulphoxides, sulphones or butylglycol and mixtures thereof. Alcohols are preferably used. It is also possible to use high-boiling solvents; e.g. polyethers such as triethylene glycol, diethylene glycol diethyl ether and tetraethylene glycol dimethyl ether. In some cases, other solvents are also used, e.g. light paraffins (petroleum ether, alkanes and cycloalkanes), aromatics, heteroaromatics and halogenated hydrocarbons.

Other conventional additives are, for example, dyes, pigments, viscosity regulators and surfactants. For the preparation of emulsions of the binder, for example, the stabilizing emulsifiers customary in the case of silicone emulsions, such as, for example, Tween 80 and Brij 30, can be used.

The binder according to the invention which is obtained is usually present in particle-free form as a solution or emulsion and is in particular free of crystalline products or particles. In particular, it is a binder sol. By means of photocorrelation spectroscopy (PCS), it was possible to show that the binders obtained in the examples contain substantially no particles. This shows that $TiO_2$ particles are not formed, as in the prior art, but a homogeneous heterocondensate is formed.

According to the invention, a binder is accordingly provided which comprises a heterocondensate which is a metallo- or borosiloxane and contains heteroatom units of heteroatoms selected from B, Al, Ga, In, Tl, Ge, Ga, Sn, Pb, Ti, Zr, Hf, Sc, Y and La, which are incorporated into the siloxane framework via oxygen bridges, and siloxane units in which the silicon atom has a non-hydrolyzable organic polymerizable group. Depending on valency, the heteroatom is incorporated into the siloxane framework via 2, 3 or 4 oxygen bridges. Preferably used heteroatoms are B, Al, Sn, Ti or Zr, so that boro-, alumino-, stanno-, titano- or zirconosiloxanes are formed, titanosiloxanes being particularly preferred.

At least some of the Si atoms or all Si atoms of the siloxane framework have a non-hydrolyzable organic polymerizable group. The Si atoms having an organic polymerizable group are bound in the heterocondensate via at least one oxygen bridge, preferably 2 and particularly preferably 3 oxygen bridges. The exact structure depends on the hydrolyzable Si component (a) which is used in the process according to the invention. If, in addition, Si components (b) and/or (c) according to the formulae (II) and (III) are used, the heterocondensate also comprises corresponding siloxane units. The Si component (a) gives siloxane units having a silicon atom which contains at least one non-hydrolyzable organic nonpolymerizable group and is bonded in the condensate via 1 oxygen bridge, preferably 2 and particularly preferably 3 oxygen bridges. The Si component (b) leads to tetrafunctional siloxane units in the heterocondensate, i.e. the Si atom is incorporated into the framework via 4 hydrogen bridges.

The formation of the heterocondensate can be illustrated schematically as follows, without taking into account ratios or distribution, the radicals Rx representing the non-hydrolyzable organic polymerizable group and X representing the hydrolyzable group as defined in the above formulae:

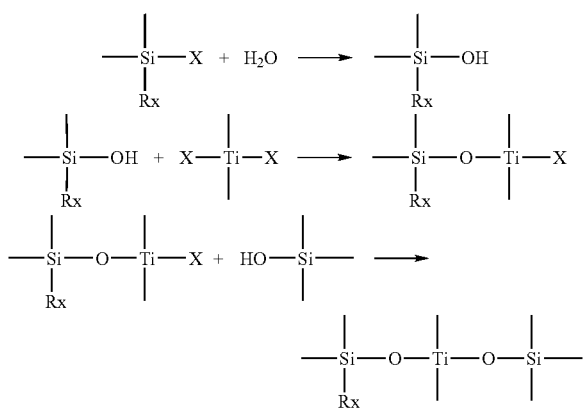

The undefined valences in the scheme may denote substituents according to the above formulae, OH groups or oxygen bridges. During the curing, covalent bonds can be established within the inorganic framework and optionally with the added organic components via the polymerizable group Rx. Very homogeneous heterocondensates in which the heteroatoms are distributed homogeneously in the condensate, i.e. in molecular disperse form, may advantageously be formed by the processes according to the invention. In contrast, the heteroatoms in the process according to the prior art condense substantially with one another so that, for example, in the case of Ti, substantially $TiO_2$ particles are formed in addition to a siloxane condensate and no homogeneous heterocondensates are obtained.

A further important advantage of the binders obtained is that they are present as a sol or solution even after a relatively long time and do not form a gel. Thus, the binders of Examples 1 to 4 gelled only after 1 to 2 days, while the binders of Examples 5 and 6 were stable even after 5 days and showed no gel formation. The stability of the binder sols is important since gelled binders are no longer usable since mixing with the respective material is no longer possible. According to the invention, stable and hence storable binders are obtained. The condensates prepared by the processes of the prior art gel after only a short time, sometimes within less than 1 h. Such condensates are virtually unusable as binders.

Oil-, hot water- and heat-stable binders are obtained. They are suitable for the production of moldings or consolidation of materials by mixing the binder with a suitable material, for example in the form of particles, granules or fibers, optionally bringing it into the desired shape and then curing it. The material to be set may be selected, for example, from metals, non-metals, glass, ceramic, carbon, oxides, nitrides, carbides, borides, minerals, plastics, plastic fibers, glass fibers, mineral fibers, natural fibers, sand and wood-based materials. In a preferred embodiment, the binder according to the invention serves for consolidating inorganic granules, such as, for example, sand. For this purpose, a bed of inorganic granules or another material is mixed with the binder and then cured. Mixing can be effected in a customary manner, for example by admixing or infiltrating the binder into the material to be consolidated, for example by pumping in.

The curing of the binder or of the molding is preferably carried out thermally by supplying heat. Examples of catalysts or initiators suitable for this purpose were mentioned above. Another method of curing is to supply condensation catalysts which result in further crosslinking of the inorganically crosslinkable SiOH groups or metal-OH groups with formation of an inorganic network. Condensation catalysts suitable for this purpose are, for example, bases, but also fluoride ions.

The properties of materials bound using a binder also depend on the conditions under which they are cured. The curing is also referred to as setting. As a rule, improved behavior is obtained if the setting process is effected under approximately the same conditions under which the set moldings or formations are to be used or are present. For applications at elevated pressures and temperatures, it is therefore desirable also to carry out the preparation under approximately the same conditions.

Thus, for example at relatively great water depths, hydrothermal conditions are present, i.e. an elevated temperature and elevated pressure so that, for applications at such water depths, it is expedient to carry out the setting also under the corresponding hydrothermal conditions, e.g. at temperatures above 40° C. and at least 4 bar, or directly at the place of use. A particular advantage of the binder according to the invention is that it can be cured or set even under such hydrothermal conditions so that it is particularly suitable for applications under these conditions, for example under water.

The setting (curing) for such applications is preferably effected at elevated temperature and elevated pressure, based on the normal conditions, i.e. the pressure is greater than 1 bar and the temperature is higher than 20° C. Preferably, the binder is cured according to the general geological conditions of the reservoir in which it is used, as a rule at temperatures above 40° C. and pressures of at least 40 bar. By using the organic component, improved mechanical strength and good flexibility is also achieved by formation of the IPN polymer after setting.

Since, particularly under hydrothermal conditions, setting of materials with the binder according to the invention partly or completely prevents a compacting process, the binder can close pores with a large volume. This can be prevented or eliminated preferably by passing a solid or liquid medium into the material which is to be set and which has been mixed with the binder, with the result that the porosity can be established in the desired manner. The introduction is effected in particular before or during the setting over a certain period.

Parameters for pumping through, such as duration, time, amount and flow rate of the liquid or gaseous phase, can be readily chosen by the person skilled in the art in a suitable manner in order to establish the desired porosity. The introduction can be effected, for example, before or after partial curing, complete curing taking place after and/or during the introduction. For introducing a liquid or gaseous medium, for example, an inert solvent or gas, e.g. $N_2$, $CO_2$ or air, can be pumped in, with the result that the pore volumes are flushed clear and reaction products removed. The liquid or gaseous medium can optionally contain catalysts and/or gas-releasing components or dissolved solids.

The binder according to the invention can therefore be used for the formation of moldings or for the consolidation of formations. In particular, the binder can be used for the consolidation of geological formations and for the consolidation of beds of granules, as used in oil and gas production for keeping the wells free. The binder is also suitable for consolidating foundry sands. Further fields of use for the binder are the consolidation of friable sandstones in architecture or the production of brake linings.

Owing to its chemical constitution as explained above, the binder according to the invention permits rapid and effective consolidation of oil- or water-carrying, generally sand-containing geological formations. Furthermore, it was found that the binders are also particularly suitable for contaminated sands, in particular oil-polluted sands, since the binder can migrate under dirt, in particular an oil layer on the inorganic surface, and detach it. The latter has the additional effect that such systems are also suitable for detaching fats and oils from inorganic surfaces and, for example, improving the discharge of such substances from the interstices of sand beds or geological formations. It is therefore possible to realize binding processes in oil-containing sands and to clean such sands by removing oil. The treatment of contaminated sand with the binder can therefore perform a consolidating or a cleaning function or can fulfil both purposes.

For this purpose, the heterocondensate may additionally contain a component which is oleophobic and hydrophobic, with the result that the wetting behaviour of geological formations can be changed. Preferably, one or more silanes of the general formula (V)

$$Rf(R)_b SiX_{(3-b)} \qquad (V)$$

in which X and R are as defined in formula (I), Rf is a non-hydrolyzable group which has 1 to 30 fluorine atoms bonded to aliphatic carbon atoms and b is 0, 1 or 2, are used for the oleophobic and hydrophobic component of the heterocondensate as an additional Si component for the preparation of the heterocondensate. These compounds are also referred to below as fluorosilanes. The silane can be used in the process according to the invention as an additional Si component in exactly the same way as described above for the other optional Si components.

In the formula (V), Rf is preferably a fluorinated alkyl group, for example having 3 to 20 C atoms, and examples are $CF_3CH_2CH_2$, $C_2F_5CH_2CH_2$, n-$C_6F_{13}CH_2CH_2$, i-$C_3F_7OCH_2CH_2CH_2$, n-$C_8F_{17}CH_2CH_2$ and n-$C_{10}F_{21}$—$CH_2CH_2$. Preferred examples of Rf are 1H,1H,2H,2H-perfluorooctyl. Examples of fluorosilanes which may be used are $CF_3CH_2CH_2SiCl_2(CH_3)$, $CF_3CH_2CH_2SiCl(CH_3)_2$, $CF_3CH_2CH_2Si(CH_3)(OCH_3)_2$, $C_2F_5$—$CH_2CH_2$—$SiZ_3$, n-$C_6F_{13}$—$CH_2CH_2SiZ_3$, n-$C_8F_{17}$—$CH_2CH_2$—$SiZ_3$, n-$C_{10}F_{21}$—$CH_2CH_2$—$SiZ_3$, in which Z=$OCH_3$, $OC_2H_5$ or Cl; i-$C_3F_7O$—$CH_2CH_2CH_2$—$SiCl_2(CH_3)$, n-$C_6F_{13}$—$CH_2CH_2$—$Si(OCH_2CH_3)_2$, n-$C_6F_{13}$—$CH_2CH_2$—$SiCl_2(CH_3)$ and n-$C_6F_{13}$—$CH_2CH_2$—$SiCl(CH_3)_2$.

The binder may result in a change in the wetting behavior of sands so that it serves rather as a composition regulating the wetting. It may be expedient for this purpose to use the binder in high dilution, for example having a solids content of not more than 10% by weight.

There follow examples for explaining the invention, but which are not intended to limit it in any way.

EXAMPLE 1

Preparation of the Batch 11.85 g of MTEOS (6.65 mmol), 5.22 g of MPTS (21.02 mmol), 0.445 g of VTES (0.23 mmol) and 5.72 g of TEOS (27.47 mmol) are mixed, and a mixture of 0.38 g of 37% HCl and 2.34 g of water (0.13 mol) is added with stirring. As soon as the transition point of the sol is reached within 1-2 minutes, 10.04 g of TPT (tetraisopropyl titanate) (35.3 mmol) are added to the sol in one shot. After stirring overnight, 2.54 g of water (0.141 mol) are added dropwise to the sol and stirring is continued for 30 min. Thereafter, an acrylate mixture comprising 8.26 g of diurethane dimethacrylate, 2.3 g of diethylene glycol dimethacrylate and 10.48 g of bisphenol A diacrylate is added. 0.56 g of Trigonoxe 121 is then added as a thermal initiator.

Production of the Molding

The prepared sol is homogeneously distributed with "proppants", i.e. sand grains which are used in mineral oil production, in particular offshore production, in a 20 ml syringe and cured under autoclave conditions of 70° C. at 70 bar for 16 hours.

The compressive strength of the molding produced was 4.5 MPa.

EXAMPLE 2

11.85 g of MTEOS (6.65 mmol), 5.22 g of MPTS (21.02 mmol), 0.445 g of VTES (0.23 mmol), 5.72 g of TEOS (27.47 mmol) and 8.4 g of poly(diethoxysilane) (20.5-21.5% of Si) are mixed, and a mixture of 0.38 g of 37% HCl and 2.91 g of water (0.162 mol) is added with stirring. As soon as the transition point of the sol is reached within 1-2 minutes, 10.04 g of TPT (35.3 mmol) are added to the sol in one shot. After stirring overnight, 3.2 g of water (0.178 mol) are added dropwise to the sol and stirring is continued for 30 min. Thereafter, an acrylate mixture comprising 8.26 g of diurethane dimethacrylate, 2.3 g of diethylene glycol dimethacrylate and 10.48 g of bisphenol A diacrylate is added. 0.32 g of Trigonox® 121 is then added as a thermal initiator. A molding is produced as in Example 1.

The compressive strength of the molding produced was 4.3 MPa.

EXAMPLE 3

11.85 g of MTEOS (6.65 mmol), 5.22 g of MPTS (21.02 mmol), 0.445 g of VTES (0.23 mmol), 5.72 g of TEOS (27.47 mmol) and 3.77 g of polydimethylsiloxane having terminal hydroxyl groups (molecular weight of 400-700 g/mol) are mixed, and a mixture of 0.38 g of 37% HCl and 2.34 g of water (0.13 mol) is added with stirring. As soon as the transition point of the sol is reached within 1-2 minutes, 10.04 g of TPT (35.3 mmol) are added to the sol in one shot. After stirring overnight, 2.54 g of water (0.141 mol) are added dropwise to the sol and stirring is continued for 30 min. Thereafter, an acrylate mixture comprising 8.26 g of diurethane dimethacrylate, 2.3 g of diethylene glycol dimethacrylate and 10.48 g of bisphenol A diacrylate was added. 0.32 g of Trigonox® 121 was then added as a thermal initiator. The molding was produced as in Example 1.

The compressive strength of the molding produced was 4.8 MPa.

EXAMPLE 4

11.85 g of MTEOS (6.65 mmol), 5.22 g of MPTS (21.02 mmol), 0.445 g of VTES (0.23 mmol), 5.72 g of TEOS (27.47 mmol) and 3.77 g of polydimethylsiloxane having terminal hydroxyl groups (molecular weight of 1500-2000 g/mol) were mixed and a mixture of 0.38 g of 37% HCl and 2.34 g of water (0.13 mol) was added with stirring. 10.04 g of TPT (35.3 mmol) were added to the sol in one shot 1-2 minutes after the addition of HCl and water. After stirring overnight, 2.54 g of water (0.141 mol) were added dropwise to the sol and stirring was continued for 30 minutes. Thereafter, an acrylate mixture comprising 8.26 g of diurethane dimethacrylate, 2.3 g of diethylene glycol dimethacrylate and 10.48 g of bisphenol A diacrylate was added. 0.32 g of Trigonox® 121 was then added as a thermal initiator. The molding was produced as in Example 1.

The compressive strength of the molding produced was 5.9 MPa.

EXAMPLE 5

11.33 g of MPTS (45.6 mmol) and 5.65 g of polydimethylsiloxane having terminal hydroxyl groups (molecular weight of 400-700 g/mol) were mixed and a mixture of 0.122 g of 37% HCl and 1.18 g of water (66.6 mmol) was added with stirring. 10.04 g of TPT (35.3 mmol) were added to the sol in one shot 1 minute after the addition of HCl and water and stirring was continued for 2 hours. Thereafter, 1.53 g of water (85 mmol) were added dropwise. After stirring overnight, an acrylate mixture comprising 8.26 g of diurethane dimethacrylate, 2.3 g of diethylene glycol dimethacrylate and 10.48 g of bisphenol A diacrylate was added. 0.3 g of Trigonox® 121 was then added as a thermal initiator. The molding was produced as in Example 1.

The compressive strength of the molding produced was 8.2 MPa.

EXAMPLE 6

11.33 g of MPTS (45.6 mmol) and 3.76 g of polydimethylsiloxane having terminal hydroxyl groups (molecular weight of 1500-2000 g/mol) were mixed and a mixture of 0.136 g of 37% HCl and 1.45 g of water (80.6 mmol) was added with stirring. 13.4 g of TPT (47.1 mmol) were added to the sol in one shot 1 minute after the addition of HCl and water and stirring was continued for 2 hours. Thereafter, 1.88 g (0.105 mol) of water were added dropwise. After stirring overnight, an acrylate mixture comprising 8.26 g of diurethane dimethacrylate, 2.3 g of diethylene glycol dimethacrylate and 10.48 g of bisphenol A diacrylate was added. 0.3 g of Trigonox® 121 was then added as a thermal initiator. The molding was produced as in Example 1.

The compressive strength of the molding produced was 11 MPa.

The effect of the binder according to the invention was very clearly evident in the autoclave experiment. While bound moldings with a comparative binder which does not have the described incorporation of the metal or boron either suffer dramatically loss in strength or disintegrate in a 12 hour experiment, the titanium-containing binder very substantially retains its initial strength, which may be between five and 12 MPa codepending on binder, amount and porosity.

What is claimed is:

1. A process for preparing a binder which comprises a heterocondensate of silicon compounds and metal or boron compounds, which process comprises
   (a) mixing a silicon component which comprises (A), at least one hydrolyzable silicon compound having a non-hydrolyzable polymerizable group, with water to form a hydrolysis product and
   (b) 15 s to 15 min after mixing (A) with water, adding (B), at least one compound of boron or a metal selected from Al, Ga, In, Tl, Ge, Ga, Sn, Pb, Ti, Zr, Hf, Sc, Y, or La, to the hydrolysis product.

2. The process of claim 1, wherein the water used in (a) comprises a catalyst.

3. The process of claim 2, wherein the catalyst comprises an acid.

4. The process of claim 1, wherein at least one polysiloxane having at least one reactive group is added.

5. The process of claim 4, wherein the at least one polysiloxane comprises at least one silanol or alkoxy group as a reactive group.

6. The process of claim 1, wherein (b) is carried out close to a transition point at which the aqueous phase and the organic phase which are formed upon mixing (A) with water become a single phase.

7. The process of claim 1, wherein (A) and (B) are employed in a solvent-free state.

8. The process of claim 1, wherein (B) is added in one shot.

9. The process of claim 1, wherein after (b) the binder is allowed to ripen for at least 1 h.

10. The process of claim 1, wherein after (b) additional water is added.

11. The process of claim 1, wherein the Si component further comprises at least one hydrolyzable silicon compound selected from hydrolyzable silanes having at least one non-hydrolyzable organic group and hydrolyzable silanes without non-hydrolyzable groups.

12. The process of claim 1, wherein the process further comprises adding a polymerization catalyst to the binder.

13. The process of claim 1, wherein the process further comprises adding to the binder at least one organic monomer, oligomer or polymer which comprises at least one functional group that is reactive with the polymerizable group of (A).

14. The process of claim 1, wherein (B) comprises at least one compound selected from compounds of B, Al, Sn, Ti, or Zr.

15. The process of claim 1, wherein (B) comprises a Ti compound.

16. The process of claim 1, wherein (B) comprises at least one alkoxide of titanium, zirconium or aluminum.

17. The process of claim 1, wherein a molar ratio of Si atoms to metal and/or boron atoms in the binder is from 10:1 to 1:3.

18. The process of claim 1, wherein the process further comprises adding at least one of a solvent or a further additive.

19. A heterocondensate binder, wherein the binder comprises a heterocondensate which is at least one of a metallosiloxane and a borosiloxane and comprises (i) units of heteroatoms selected from B, Al, Ga, In, Tl, Ge, Ga, Sn, Pb, Ti, Zr, Hf, Sc, Y, or La, incorporated into a siloxane skeleton via oxygen bridges, and (ii) siloxane units in which a silicon atom carries a non-hydrolyzable organic polymerizable group.

20. A method of consolidating (i) geological formations, (ii) inorganic granules and/or (iii) beds of granules used in oil and gas production for keeping the wells clear, wherein the method comprises combining one or more of (i), (ii), or (iii) with the binder of claim 19.

21. The method of claim 20, wherein the binder is mixed with a bed of inorganic granules or the geological formation and is thermally cured.

22. The method of claim 21, wherein the binder is infiltrated into the bed or formation.

23. The binder of claim 19, wherein the binder further comprises a polymerization catalyst which can initiate an organic polymerization.

24. The binder of claim 23, wherein the polymerization catalyst comprises a thermal initiator.

25. A molding which comprises the binder of claim 19 and a particulate or fibrous material.

26. The molding of claim 25, wherein the molding comprises a porous molding.

27. The molding of claim 25, wherein the cured binder is an IPN polymer.

28. The binder of claim 19, wherein the binder is obtainable by a process which comprises (a) mixing a silicon component which comprises (A), at least one hydrolyzable silicon compound having a non-hydrolyzable polymerizable group, with water to form a hydrolysis product and (b) 15 s to 15 min after mixing (A) with water, adding (B), at least one compound of boron or a metal selected from Al, Ga, In, Tl, Ge, Ga, Sn, Pb, Ti, Zr, Hf, Sc, Y, or La, to the hydrolysis product.

29. The binder of claim 19, wherein the binder comprises a binder sol.

30. The binder of claim 19, wherein the binder is particle-free.

31. The binder of claim 19, wherein the binder comprises the heterocondensate as an inorganic component and one or more substances selected from organic monomers, oligomers or polymers as an organic component, which inorganic and organic components are capable of forming, upon curing, an inorganic-organic composite as an interpenetrating polymeric network.

32. The binder of claim 31, wherein a weight ratio of heterocondensate and organic component, based on a cured binder, is from 95:5 to 5:95.

33. The binder of claim 19, wherein the units of heteroatoms comprise at least one of B, Al, Sn, Ti, or Zr.

34. The binder of claim 19, wherein the heterocondensate comprises a titanosiloxane.

35. A method of treating contaminated sand, wherein the method comprises combining the contaminated sand with the binder of claim 19.

* * * * *